US008599742B2

(12) United States Patent
Liu et al.

(10) Patent No.: US 8,599,742 B2
(45) Date of Patent: Dec. 3, 2013

(54) INTERFERENCE ESTIMATION FOR UPLINK TDM IN A WIRELESS SYSTEM

(75) Inventors: Jinhua Liu, Beijing (CN); Qingyu Miao, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 400 days.

(21) Appl. No.: 12/867,359

(22) PCT Filed: Apr. 9, 2008

(86) PCT No.: PCT/SE2008/050405
§ 371 (c)(1),
(2), (4) Date: Aug. 12, 2010

(87) PCT Pub. No.: WO2009/126075
PCT Pub. Date: Oct. 15, 2009

(65) Prior Publication Data
US 2010/0309833 A1    Dec. 9, 2010

(51) Int. Cl.
*H04B 7/185* (2006.01)
(52) U.S. Cl.
USPC .......................... 370/318; 370/252; 370/347
(58) Field of Classification Search
USPC .......................................... 370/252, 318, 347
See application file for complete search history.

(56) References Cited

U.S. PATENT DOCUMENTS

| | | | |
|---|---|---|---|
| 6,269,093 B1 | 7/2001 | Alapuranen et al. | |
| 6,650,872 B1 | 11/2003 | Karlsson et al. | |
| 6,842,438 B1* | 1/2005 | Benedict et al. | 370/328 |
| 2007/0121554 A1* | 5/2007 | Luo et al. | 370/335 |
| 2007/0258547 A1* | 11/2007 | Montalbano | 375/343 |
| 2007/0293257 A1* | 12/2007 | Usuda et al. | 455/513 |
| 2009/0061886 A1* | 3/2009 | Cozzo et al. | 455/450 |
| 2010/0197337 A1* | 8/2010 | Larsson et al. | 455/522 |
| 2010/0238832 A1* | 9/2010 | Gunnarsson et al. | 370/252 |
| 2010/0303030 A1* | 12/2010 | Andersson | 370/329 |
| 2011/0021239 A1* | 1/2011 | Wakabayashi et al. | 455/522 |
| 2012/0172074 A1* | 7/2012 | Booker et al. | 455/501 |

OTHER PUBLICATIONS

International Search Report for PCT/SE2008/050405, mailed Mar. 4, 2009.
Conti, M. et al., "Traffic and interference adaptive scheduling for Internet traffic in UMTS," Computers and Communications, (2002), pp. 391-396.

* cited by examiner

*Primary Examiner* — Jason Mattis
(74) *Attorney, Agent, or Firm* — Nixon & Vanderhye, P.C.

(57) ABSTRACT

A system can be implemented in a station associated with a wireless network and the station can receive uplink time division multiplexed (TDM) transmissions from a user device. The system includes a first filter to filter uplink TDM transmissions, associated with the user device, during a first period of time when the user device is transmitting on an uplink data channel (DCH) to generate a first interference estimate. The system further includes a second filter to filter uplink TDM transmissions, associated with the user device, during a second period of time when the user device is not transmitting on the uplink DCH to generate a second interference estimate. The system also includes a third filter to filter uplink TDM transmissions, associated with the user device, during the first and second periods of time, to generate a third interference estimate. The system further includes a power control unit to determine one or more power control commands for sending to the user device based on the first, second and third interference estimates.

18 Claims, 14 Drawing Sheets

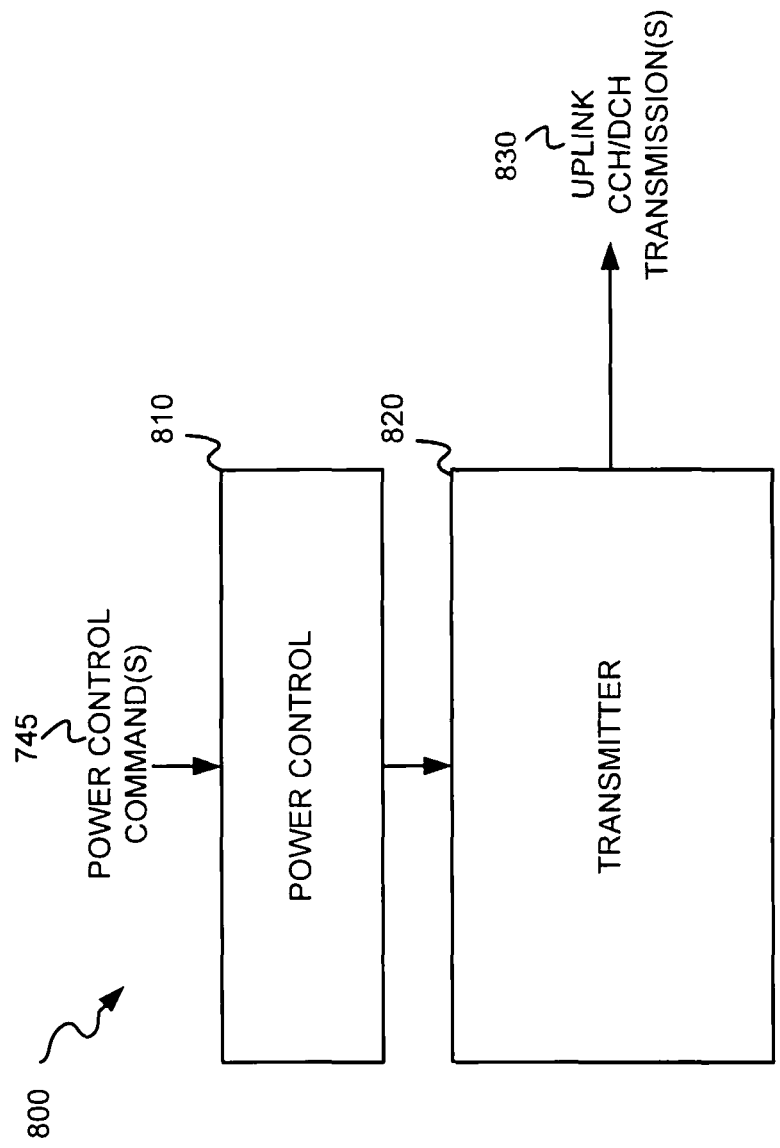

INTERFERENCE ESTIMATION FOR UPLINK TDM IN A WIRELESS SYSTEM

This application is the U.S. national phase of International Application No. PCT/SE2008/050405 filed 9 Apr. 2008, which designated the U.S. and the entire contents of which is hereby incorporated by reference.

TECHNICAL FIELD

Implementations described herein relate generally to interference estimation for power control in wireless systems.

BACKGROUND

The $3^{rd}$ Generation Partnership Project (3GPP) is a globally applicable third generation mobile phone system specification that is a result of collaboration between various groups of telecommunications associations, including the European Telecommunications Standards to Institute, the Association of Radio Industries and Businesses/Telecommunication Technology Committee (ARIB/TTC), China Communications Standards Association, and the Alliance for Telecommunications Industry Solutions. 3GPP release 99 specified the first Universal Mobile Telecommunications System (UMTS) 3G network that incorporates a Code Division Multiple Access (CDMA) air interface.

In 3GPP, release 99, control channel information is carried over a Dedicated Physical Control Channel (DPCCH) and user data is carried over a Dedicated Physical Data Channel (DPDCH). Inner Loop Power Control (ILPC) in 3GPP release 99 aims to maintain a DPCCH signal-to-interference ratio (SIR) level associated with a user device's uplink transmissions around a DPCCH SIR target. The DPCCH SIR target is regularly updated by an Outer Loop ower Control (OLPC) scheme. OLPC aims at maintaining a predetermined block error rate (BLER) by updating the DPCCH SIR target based on the transport block error statistics.

In the evolved 3G standards, High Speed Uplink Packet Access (HSUPA), also called "Enhanced Uplink" (EUL), has been introduced. The aim of EUL is to increase the uplink data transfer speed in the UMTS environment and it offers data speeds of up to 5.8 Mbps on the uplink. EUL achieves this high performance based, in part, on the use of time division multiplexing (TDM), in addition to CDMA, to create multiple, repeating transmission time intervals (TTIs) on the uplink that can be allocated to user equipment that is attempting to transmit at high speed on the uplink.

In EUL, the DPCCH is still used as a control channel. Additionally, two new physical uplink data channels have been introduced for EUL: an Enhanced Dedicated Physical Data Channel (E-DPDCH) and an Enhanced Dedicated Physical Control Channel (E-DPCCH). The DPCCH carries control channel information such as pilot symbols for channel estimation, etc. The E-DPCCH is used to carry other control data, such as an Enhanced Transport Format Combination Index (E-TFCI), Hybrid Automatic Repeat Request (HARQ) profile, etc. EUL also includes ILPC and OLPC techniques used in 3GPP release 99. Similar to 3GPP release 99, the ILPC for EUL also aims at maintaining a DPCCH SIR level around a DPCCH SIR target. The OLPC for EUL updates the DPCCH SIR target by monitoring the number of transmission attempts, instead of maintenance of a predetermined BLER as occurs in 3GPP release 99.

SUMMARY

Exemplary embodiments described herein implement an uplink power control process between a base station and a given user equipment (UE) device in a wireless system in which different filtering procedures may be used at the base station for estimating interference power on the uplink depending on whether a given UE device is or is not transmitting on the uplink data channel (e.g., on E-DPCCH or E-DPDCH). Thus, when the given UE device is transmitting on the uplink data channel, a first filter filters the uplink transmission to estimate a first interference value. The first filter discontinues filtering, and holds its filter state, when the UE device stops transmitting on the uplink data channel. Furthermore, when the given UE device is not transmitting on the uplink data channel, a second filter filters the uplink transmission to estimate a second interference value. The second filter discontinues filtering, and holds its filter state, when the UE device begins transmitting again on the uplink data channel. Additionally, a third filter continuously filters uplink transmission from the UE device to determine a third interference value regardless of whether the UE device is or is not transmitting on the uplink data channel. The interference values from the first, second and third filters may be used to estimate interference associated with the uplink channel. The estimated interference may be used to determine whether the UE device needs to increase or decrease power to maintain a target SIR that assists in ensuring the quality of the uplink transmissions from the UE device received at the base station. The filtering process used in exemplary embodiments described herein, thus, results in more accurate interference estimations and, therefore, improves power control of uplink transmission.

According to one aspect, a system implemented in a station associated with a wireless network, where the station receives uplink time division multiplexed (TDM) transmissions from a user device, may include a first filter to filter uplink TDM transmissions, associated with the user device, during a first period of time when the user device is transmitting on an uplink data channel to generate a first interference estimate. The system may further include a second filter to filter uplink TDM transmissions, associated with the user device, during a second period of time when the user device is not transmitting on the uplink DCH to generate a second interference estimate. The system may also include a third filter to filter uplink TDM transmissions, associated with the user device, during the first and second periods of time, to generate a third interference estimate. The system may additionally include a power control unit to determine one or more power control commands for sending to the user device based on the first, second and third interference estimates.

According to a further aspect, a method implemented at a base station that receives uplink time division multiplexed (TDM) transmissions from a user device may include filtering uplink TDM transmissions, associated with the user device, during a first period of time when the user device is transmitting on an uplink data channel (DCH), but not during a second period of time when the user device is not transmitting on the uplink DCH, to generate a first interference estimate. The method may further include filtering uplink TDM transmissions, associated with the user device, during the second period of time, but not during the first period of time, to generate a second interference estimate. The method may also include filtering uplink TDM transmissions, associated with the user device, during the first and second periods of time, to generate a third interference estimate. The method may additionally include determining one or more power control commands for sending to the user device based on the first, second and third interference estimates.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 8 is a diagram that illustrates exemplary components of power control circuitry associated with a transceiver of the user equipment device of FIG. 1;

DETAILED DESCRIPTION

The following detailed description of the invention refers to the accompanying drawings. The same reference numbers in different drawings may identify the same or similar elements. Also, the following detailed description does not limit the invention.

Figure 1:
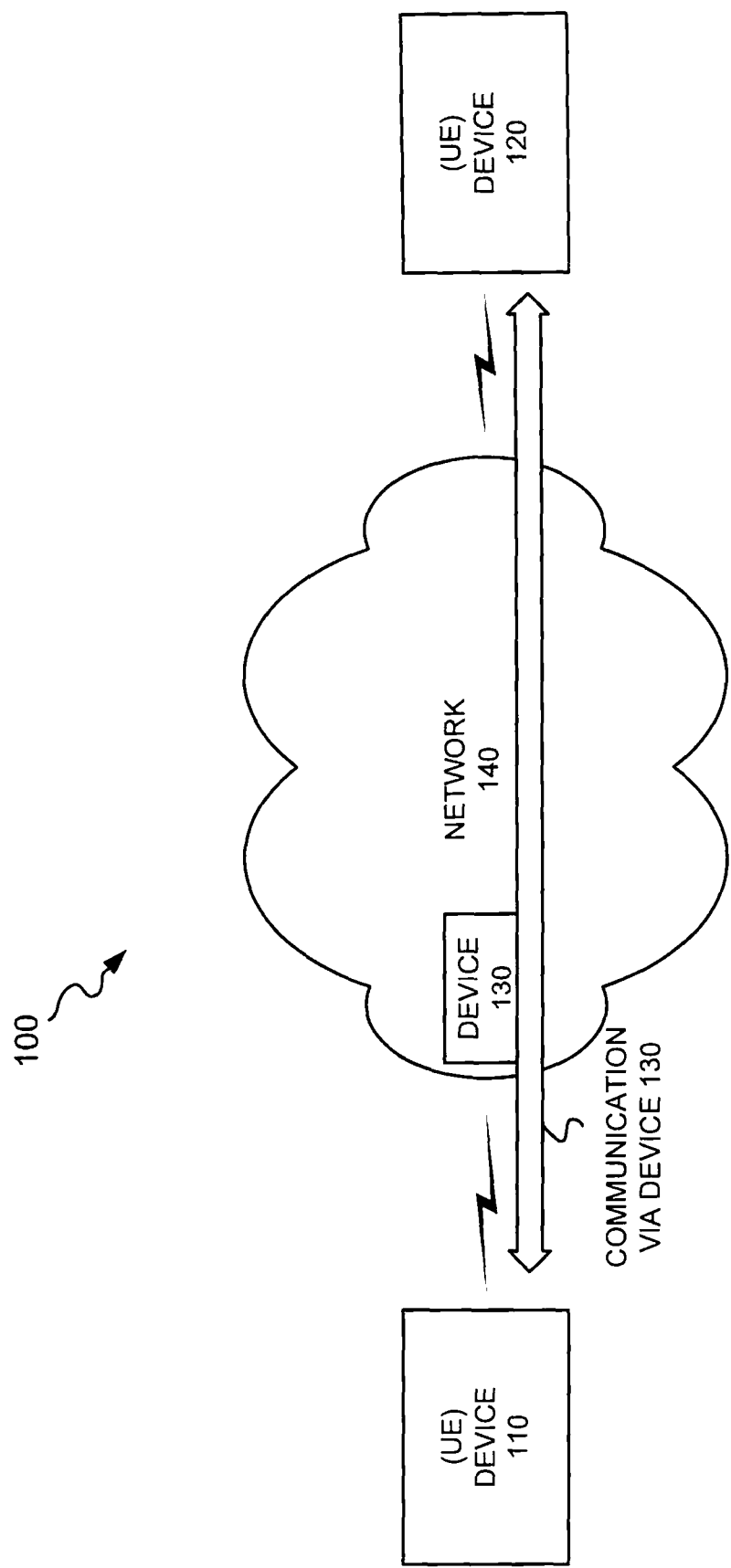
FIG. 1 illustrates two devices communicating with one another via a network.

FIG. 1 illustrates two devices 110 and 120 communicating with one another in a network 100. As shown in FIG. 1, device 110 may communicate with device 120 via a network 140. In one implementation, device 110 may communicate with device 120 via another device 130 that acts as an intermediate device between device 110 and device 120. For example, as shown in FIG. 1, device 130 may reside as an intermediate component of network 140 that may be used to facilitate end-to-end communication between devices 110 and 120. Devices 110 and 120 may be generically referred to herein as "user equipment" (UE).

Each of devices 110 and 120 may include a mobile UE such as a cellular radiotelephone, a personal digital assistant (PDA), a Personal Communications Systems (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. One or more of devices 110 and 120 may be referred to as a "pervasive computing" device. Device 130 may, in one implementation, include a base station of a Public Land Mobile Network (PLMN).

Network(s) 140 may include one or more networks of any type, including a local area network (LAN); a wide area network (WAN); a metropolitan area network (MAN); a telephone network, such as the Public Switched Telephone Network (PSTN) or a PLMN; a satellite network; an intranet, the Internet: or a combination of networks. The PLMN(s) may further include a packet-switched network, such as, for example, General Packet Radio Service (GPRS), Cellular Digital Packet Data (CDPD), or Mobile IP network.

Figure 2:
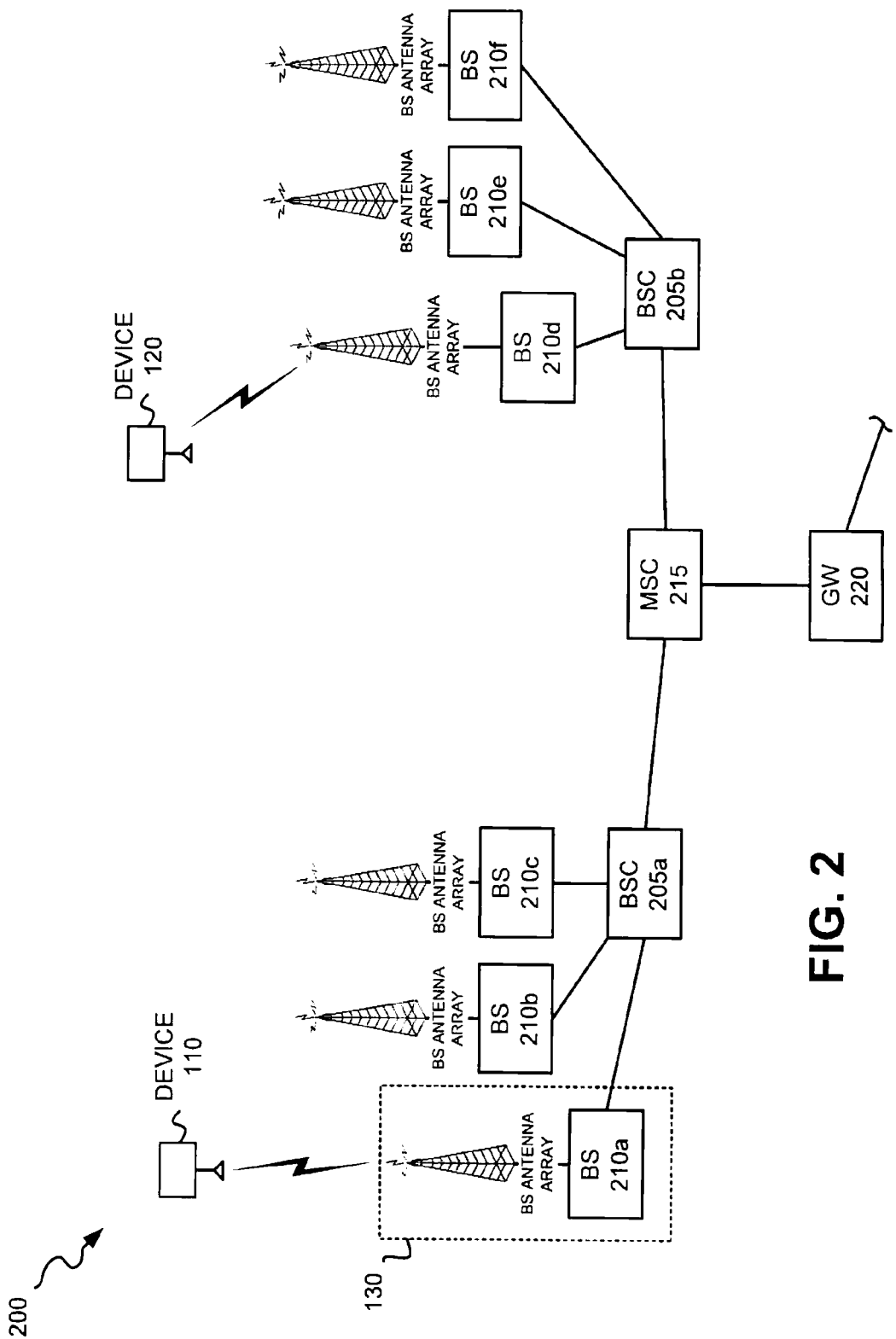
FIG. 2 illustrates an exemplary implementation in which a base station in a wireless network acts as an intermediate device to enable a user equipment device to communicate with another user equipment device or other communications device.

FIG. 2 illustrates an example of network 100 of FIG. 1, where network 140 includes a PLMN 200. As shown in FIG. 2, device 130 may include a base station of the PLMN 200 and devices 110 and 120 may include cellular radiotelephones that are communicating with one another via PLMN 200.

PLMN 200 may include one or more base station controllers (BSCs) 205a-205b (alternatively called "radio network controllers" (RNCs) in some implementations), multiple base stations (BSs) 210a-210f along with their associated antenna arrays, one or more mobile switching centers (MSCs), such as MSC 215, and one or more gateways (GWs), such as GW 220.

Base stations 210a-210f may format the data transmitted to, or received from, the antenna arrays in accordance with existing techniques and may communicate with BSCs 205a-205b or a device, such as device 110. Among other functions, BSCs 205a-205b may route received data to either MSC 215 or a base station (e.g., BSs 210a-210c or 210d-210f). MSC 215 may route received data to BSC 205a or 205b. GW 220 may route data received from an external domain (not shown) to an appropriate MSC (such as MSC 215), or from an MSC to an appropriate external domain. For example, the external domain may include the Internet or a PSTN.

Figure 3:
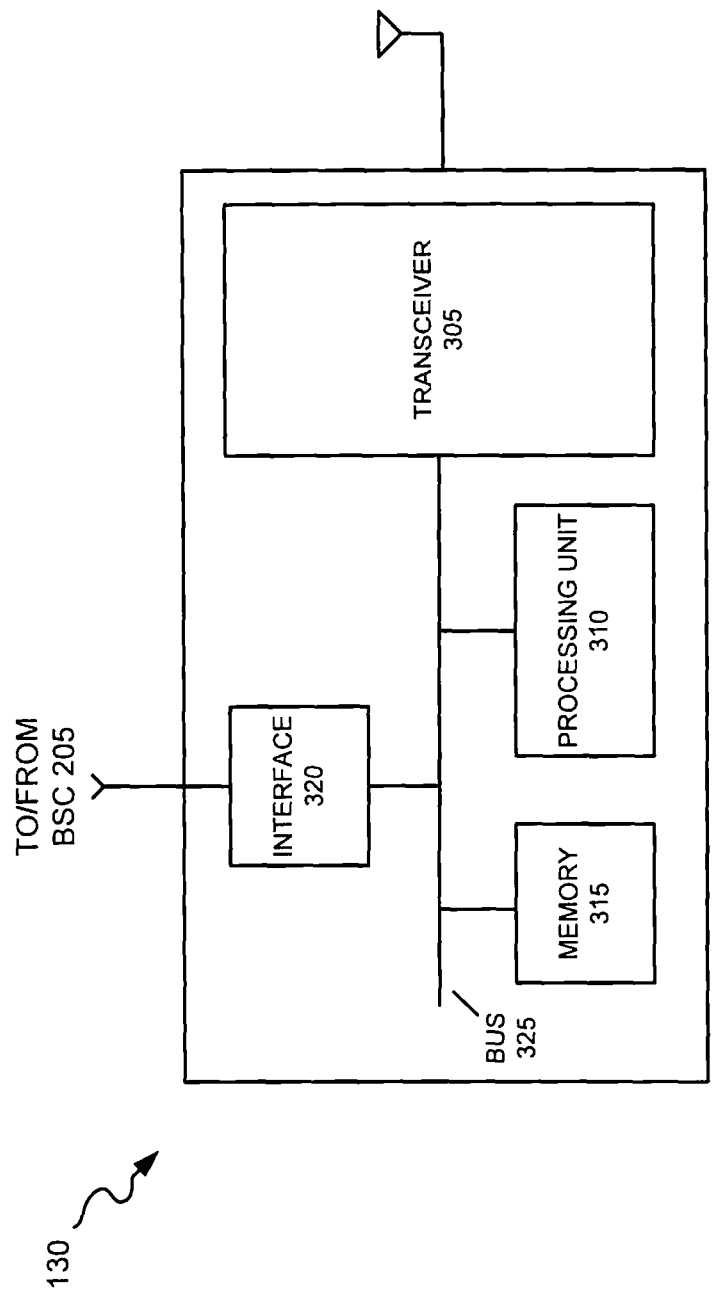
FIG. 3 illustrates exemplary components of the base station of FIG. 2.

FIG. 3 illustrates one exemplary implementation of device 130 in which device 130 includes a base station of PLMN 200. Device 130 may include a transceiver 305, a processing unit 310, a memory 315, an interface 320 and a bus 325.

Transceiver 305 may include transceiver circuitry for transmitting and/or receiving symbol sequences using radio frequency signals via one or more antennas (not shown). For example, transceiver 305 may include signal power and interference estimation circuitry (described further below) for estimating uplink signal power and interference and for determining power control commands for sending to UE device 110 for controlling the UE's uplink transmit power. Processing unit 310 may include a processor, microprocessor, or processing logic that may interpret and execute instructions. Processing unit 310 may perform all device data processing functions. Memory 315 may provide permanent, semi-permanent, or temporary working storage of data and instructions for use by processing unit 310 in performing device processing functions. Memory 315 may include read only memory (ROM), random access memory (RAM), large-capacity storage devices, such as a magnetic and/or optical recording medium and its corresponding drive, and/or other types of memory devices. Interface 320 may include circuitry for interfacing with a link that connects to a BSC (e.g., BSC 205a or BSC 205b). Bus 325 may interconnect the various components of device 130 to permit the components to communicate with one another.

The configuration of components of device 130 illustrated in FIG. 3 is for illustrative purposes only. Other configurations with more, fewer, or a different arrangement of components may be implemented.

Figure 4A:
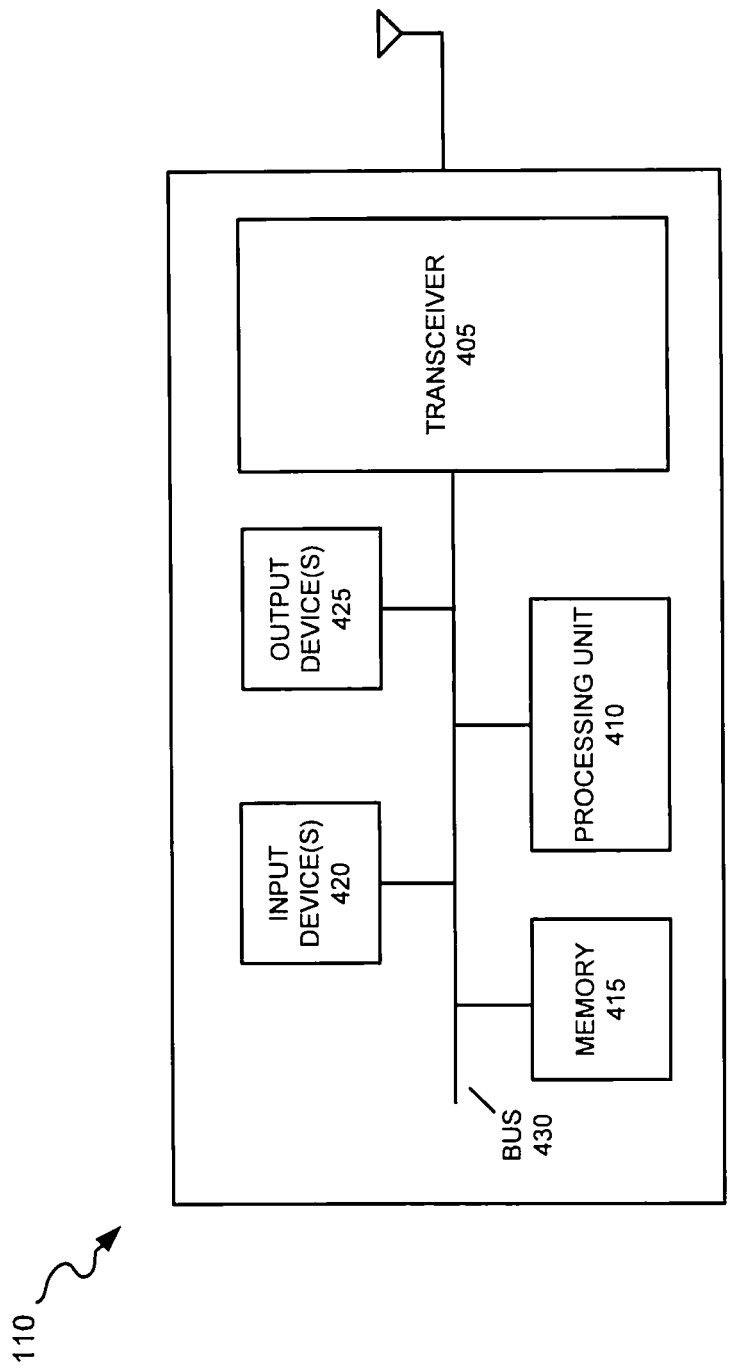
FIG. 4A illustrates exemplary components of the user equipment device of FIG. 1.

FIG. 4A illustrates UE device 110 consistent with an exemplary embodiment. UE device 120 may be similarly configured. Device 110 may include a transceiver 405, a processing unit 410, a memory 415, an input device(s) 420, an output device(s) 425, and a bus 430.

Transceiver 405 may include transceiver circuitry for transmitting and/or receiving symbol sequences using radio frequency signals via one or more antennas (not shown). Transceiver 405 may include, for example, a RAKE or a GRAKE receiver. Transceiver 405 may further include uplink power control circuitry that adjusts uplink transmit power based on power control commands received from device 130. Processing unit 410 may include a processor, microprocessor, or processing logic that may interpret and execute instructions. Processing unit 410 may perform all data processing functions for inputting, outputting, and processing of data including data buffering and device control functions, such as call processing control, user interface control, or the like.

Memory 415 may provide permanent, semi-permanent, or temporary working storage of data and instructions for use by processing unit 410 in performing device processing functions. Memory 415 may include read only memory (ROM), random access memory (RAM), large-capacity storage devices, such as a magnetic and/or optical recording medium and its corresponding drive, and/or other types of memory devices. Input device(s) 420 may include mechanisms for entry of data into device 110. For example, input device(s) 420 may include a key pad (not shown), a microphone (not shown) or a display unit (not shown). The key pad may permit manual user entry of data into device 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker (not shown) that includes mechanisms for converting electrical signals into auditory output. Output device(s) 425 may further include a display unit that displays output data to the user. For example, the display unit may provide a graphical user interface that displays output data to the user. Bus 430 may interconnect the various components of device 110 to permit the components to communicate with one another.

The configuration of components of device 110 illustrated in FIG. 4A is for illustrative purposes only. Other configurations with more, fewer, or a different arrangement of components may be implemented.

Figure 4B:
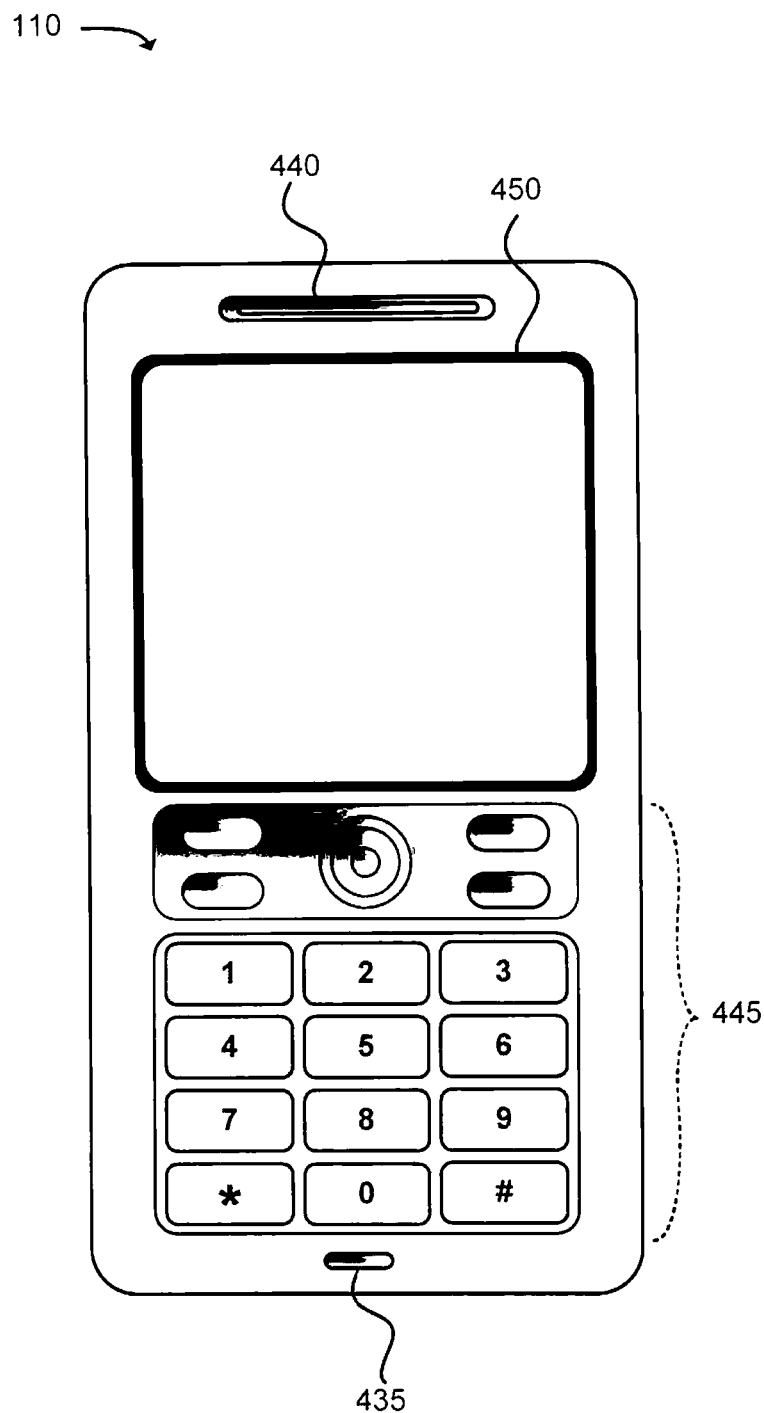
FIG. 4B illustrates an exemplary implementation of the user equipment device of FIG. 1 where the device is a cellular radiotelephone.

FIG. 4B illustrates an exemplary implementation of device 110 in which device 110 includes a cellular radiotelephone. As shown in FIG. 4B, the cellular radiotelephone may include a microphone 435 (e.g., of input device(s) 420) for entering audio information into device 110, a speaker 440 (e.g., of output device(s) 425) for providing an audio output from device 110, a keypad 445 (e.g., of input device(s) 420) for manual entry of data or selection of device functions, and a display 450 (e.g., of input device(s) 420 or output device(s) 425) that may visually display data to the user and/or which may provide a user interface that the user may use to enter data or to select device functions (in conjunction with keypad 445).

Figure 5A:
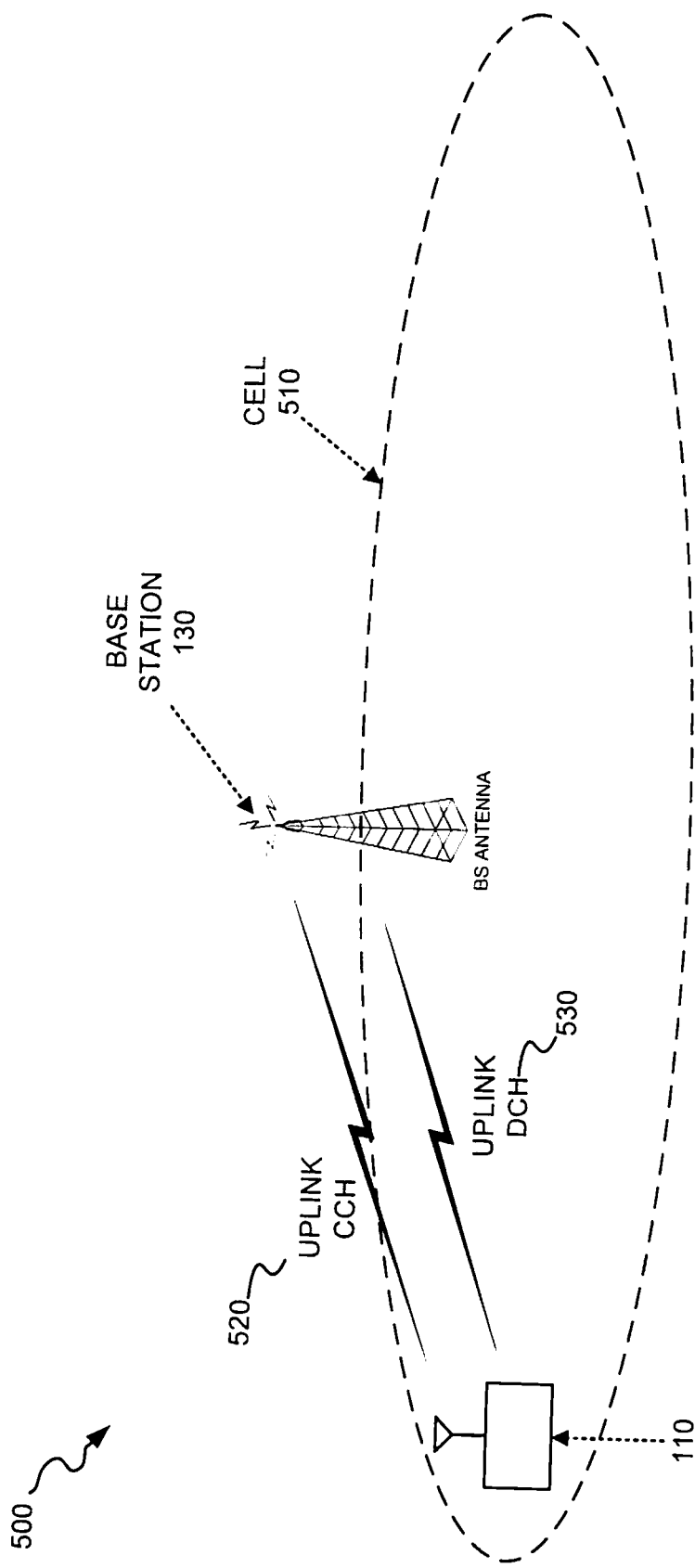
FIGS. 5A and 5B are diagrams that depict exemplary uplink communication between the user equipment device and base station of FIG. 2 in a cell of a cellular network.

FIG. 5A is a diagram that depicts exemplary uplink communication 500 between device 110 and base station 130 in a cell 510 of a PLMN (e.g., a cellular network). As shown in FIG. 5A, uplink communication between device 110 and base station 130 may include uplink control channel (CCH) transmissions 520 and uplink data channel (DCH) transmissions 530. The uplink transmissions depicted in FIG. 5A may use Code Division Multiple Access (CDMA) techniques for transmitting data between device 110 and base station 130. For example, spread spectrum CDMA techniques may be used for uplink transmission, where each different channel may be associated with a different spreading code. Base station 130 may receive each of the uplink CCH transmissions 520 and uplink DCH transmissions 530. Uplink CCH transmissions 520 may include typical control channel data related to channel estimation (e.g., pilot symbols), etc. In 3GPP, an example of a control channel includes a DPCCH. Uplink DCH transmissions 530 may include the data intended for transmission to a destination device (e.g., device 120 of FIG. 1). In 3GPP, an example of a data channel includes a DPDCH.

Figure 5B:
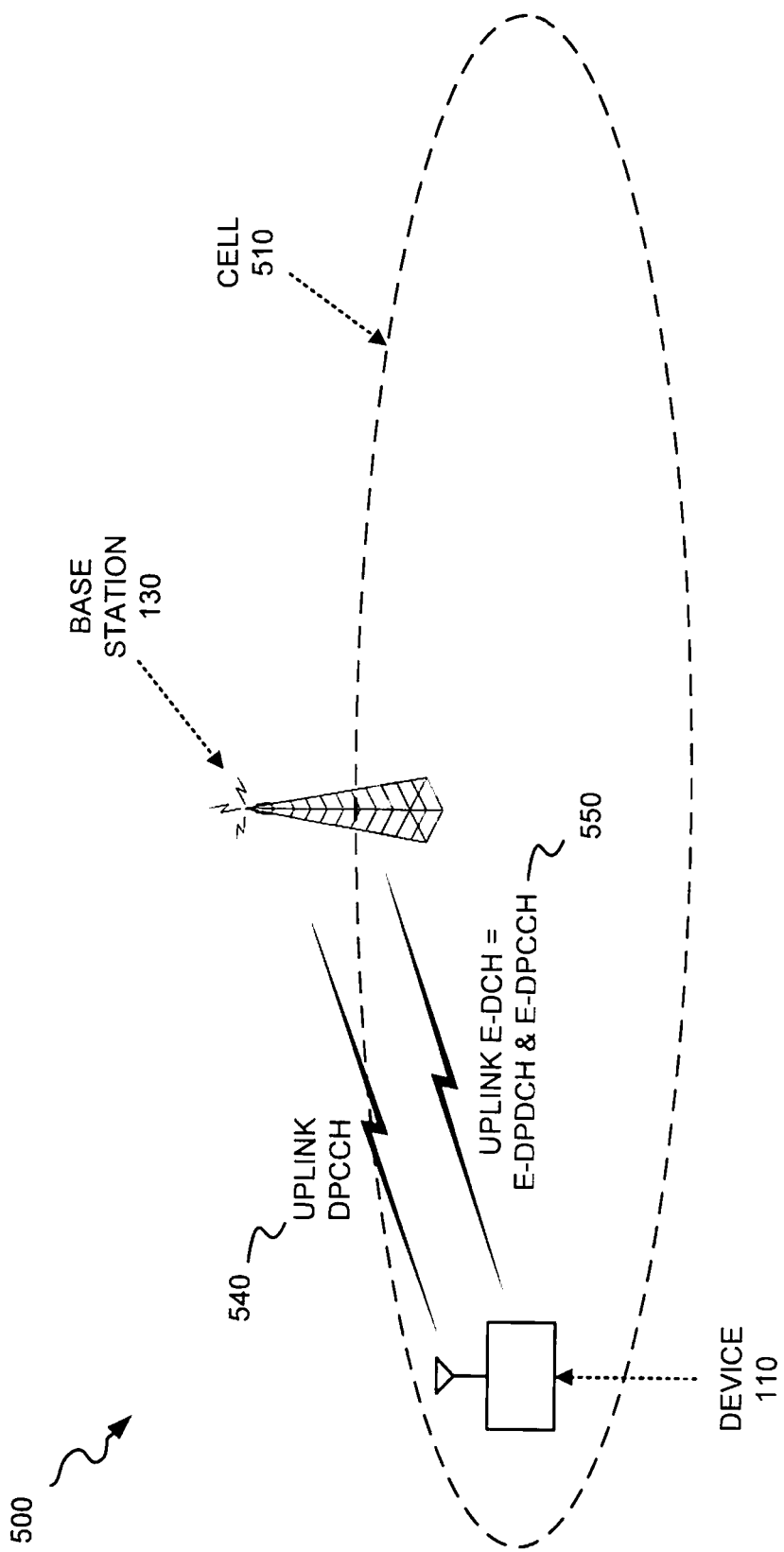

FIG. 5B is a diagram that depicts exemplary uplink communication 500 between device 110 and base station 130 in cell 510 in the case where the cellular network uses High Speed Uplink Packet Access (HSUPA) (i.e., Enhanced Uplink (EUL)). As shown in FIG. 5B, in HSUPA, uplink transmissions 500 may include uplink DPCCH transmissions 540 and uplink Enhanced Data Channel (E-DCH) transmissions 550. Similar to FIG. 5A, the uplink transmissions depicted in FIG. 5B may use CDMA techniques for transmitting data between device 110 and base station 130. In HSUPA, the DPCCH may still be used as a control channel (similar to FIG. 5A above). However, the E-DCH may include two physical channels: Enhanced Dedicated Physical Control Channel (E-DPCCH) and Enhanced Dedicated Physical Data Channel (E-DPDCH). The E-DPCCH may carry additional control data related to transmitting user data over E-DPDCH (e.g. Enhanced Transport Formation Combination Index (E-TFCI), a Hybrid Automatic Repeat Request (HARQ) profile, etc). The E-DPCCH may carry the user's actual data intended for transmission to a destination device (e.g., device 120 of FIG. 1). Base station 130 may receive each of the uplink DPCCH transmissions 540 and uplink E-DCH transmissions 550.

Figure 6A:
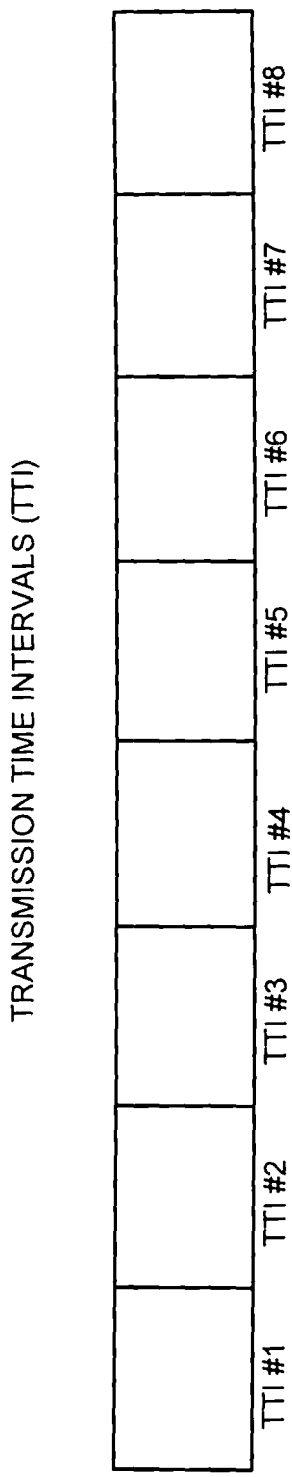
FIG. 6A is a diagram that illustrates transmission time intervals (TTIs) associated with TDM uplink transmission of an exemplary embodiment.
Figure 6B:
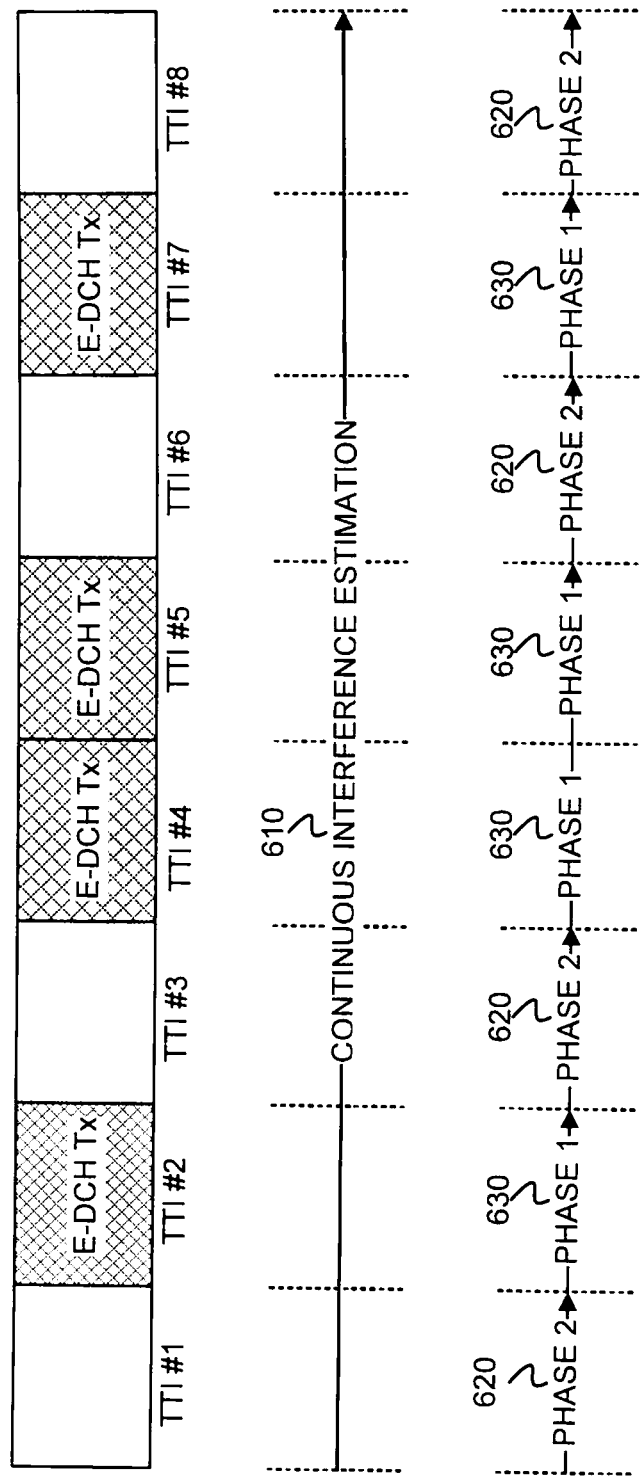
FIG. 6B is a diagram that illustrates DCH uplink transmission on selected TTIs of FIG. 6A and the performance of continuous and discontinuous interference estimation during selected TTIs.

The HSUPA standard may include improved capacity and data throughput on the uplink channels (e.g., data speeds of up to 5.8 Mbps on the uplink) as compared to 3GPP (e.g., 3GPP release 99). HSUPA achieves the improved data capacity and throughput by using time division multiplexing (TDM), in addition to CDMA, for transmission on the uplink. In TDM, each device 110 attempting to transmit at a high bit rate (HBR) on an uplink to base station 130 may be allocated multiple uplink transmission time intervals (TTIs) over which to transmit. As shown in FIG. 6A, a repeating "frame" of TTIs available on the uplink may be composed of multiple TTIs (e.g., TTI #1 through TTI #8 as shown in FIG. 6A). Multiple ones of the TTIs may be allocated to a given device 110 for transmission. For example, as shown in FIG. 6B, a single UE device 110 may be allocated TTI #2, TTI #4, TTI #5 and TTI #7 for HBR uplink transmission. In HSUPA, only one, or a few, UL users may be allowed to transmit data over an E-DCH while other uplink users are not allowed to transmit data over the E-DCH in one cell (i.e., the other users transmit in non-TDM CDMA mode on the uplink). Other UEs (not shown) may, therefore, not use TDM for uplink transmission in HSUPA. Thus, in HSUPA, two types of users may exist on the uplink: high bit-rate (HBR) users transmitting in TDM mode and low bit-rate (LBR) users transmitting in non-TDM mode. A UE device 110 using HSUPA may achieve a high data rate due to less interference from other users when the UE is transmitting data over the E-DCH as compared to non-TDM uplink transmissions.

For the user transmitting on the uplink in HSUPA in TDM mode, the effective interference may be very different between when the user's UE device 110 is transmitting data and when another user is transmitting data, since the interference from the user's own UE is fairly orthogonal. Varying of this effective interference can result in significant SIR fluctuations (i.e., fluctuations between the received power and the interference power). Since uplink power control is based on measurements of the SIR, a large fluctuation in SIR can have significant negative effects on accurate uplink power control.

In exemplary embodiments described herein different interference filtering procedures used for interference power estimation may be used in base station 130 depending on whether the user's UE is transmitting on the DCH (e.g., E-DCH) or not transmitting on the DCH (e.g., E-DCH). For example, one interference filtering procedure is active when the user is transmitting on the E-DCH (including both the E-DPCCH and the E-DPDCH) with the filter state being held when the user's UE is not transmitting on the E-DCH. Another interference filtering procedure is active when the user is not transmitting on the E-DCH with the filter state being held when the user's UE is transmitting on the E-DCH. Similarly, one power control loop is active in the UE when the UE is transmitting on the E-DCH and another power control loop is active in the UE when the UE is not transmitting on the E-DCH. In base station 130, the estimation of SIR for power control may only be based on the interference from the active interference filtering procedure.

In a HSUPA network, two types of users may use the uplink, HBR users transmitting in TDM mode and LBR users transmitting in non-TDM mode. For a given HBR user, the perceived uplink interference may be defined by the following equation:

$$I_{perceived.total} = I_{other\ cell} + I_{other\ LBR\ users} + \quad \text{Eqn. (1)}$$
$$I_{other\ HBR\ users.DPCCH} + I_{other\ HBR\ user.E-DCH} +$$
$$\alpha(Rscp_{this\ HBR\ user,DPCCH} + Rscp_{this\ HBR\ user,E-DCH}) + N_o$$

where
$I_{perceived,\ total}$ is the total perceived interference for this HBR UE,
$I_{other\ cell}$ is the inter-cell interference,
$I_{other\ LBR\ users}$ is the intra-cell interference from LBR users,
$I_{other\ HBR\ users\ DPCCH}$ is the intra-cell interference of DPCCH for other HBR users,
$I_{other\ HBR\ user,\ E-DCH}$ is the intra-cell interference from other HBR users transmitting on the uplink,
$\alpha$ is the orthogonality factor of this HBR uplink user,
$Rscp_{this\ HBR\ user,\ E-DCH}$ is the received signal code power for this HBR uplink user on E-DCH.
$Rscp_{this\ HBR\ user,\ DPCCH}$ is the received signal code power for this HBR uplink user on DPCCH, and
$N_o$ is the thermal noise.

When this HBR UE is transmitting on the E-DCH and another HBR UE is not transmitting on the E-DCH, $I_{other\ HBR\ user,\ E-DCH}$ equals zero. Therefore, the total perceived interference of this UE can be calculated by the following equation:

$$I_{perceived.total} = I_{other\ cell} + I_{other\ LBR\ users} + I_{other\ HBR\ users.DPCCH} + \quad \text{Eqn. (2)}$$
$$\alpha(Rscp_{this\ HBR\ user,DPCCH} + Rscp_{this\ HBR\ user,E-DCH}) + N_o$$

When this HBR UE is not transmitting on the E-DCH and another HBR UE is transmitting on the E-DCH, $Rscp_{this\ HBR\ user,\ E-DCH}$ equals zero. Therefore, the total perceived interference of this UE can be calculated by the following equation:

$$I_{perceived.total} = I_{other\ cell} + I_{other\ LBR\ users} + I_{other\ HBR\ users.DPCCH} + \quad \text{Eqn. (3)}$$
$$I_{other\ HBR\ user,E-DCH} + \alpha Rscp_{this\ HBR\ user,DPCCH} + N_o$$

Comparing Eqn. (2) with Eqn. (3), it is apparent that the portion of the interference that is not affected by the switch between transmitting, and not transmitting, on the E-DCH for this HBR UE can be represented by the following equation:

$$I_{perceived.not\ affected} = I_{CONT} = I_{other\ cell} + I_{other\ LBR\ users} + \quad \text{Eqn. (4)}$$
$$I_{other\ HBR\ users.DPCCH} + \alpha Rscp_{this\ HBR\ user.DPCCH} + N_o$$

It is assumed in Eqn. (4) that the inter-cell interference is not affected by the switch between transmitting and not transmitting on the E-DCH of this HBR UE even though there may be TDM users in neighboring cells. Again comparing Eqn. (2) with Eqn. (3), it is further apparent that the portion of the interference that is affected by the switch between transmitting and not transmitting on the E-DCH for this HBR UE can be represented by the following equation:

$$I_{perceived.affected} = I_{other\ HBR\ user.E-DCH} + \quad \text{Eqn. (5)}$$
$$\alpha Rscp_{this\ HBR\ user,E-DCH}$$
$$= I_{DISCONT}$$
$$= I_{DIS-2} + I_{DIS-1}$$

where
$I_{DIS-2}$ equals $I_{other\ HBR\ user,\ E-DCH}$; and
$I_{DIS-1}$ equals $\alpha Rscp_{this\ HBR\ user,\ E-DCH}$.

The UE perceived total interference can then be represented by the following equation:

$$I_{perceived.total} = I_{perceived.not\ affected} + I_{perceived.affected} \quad \text{Eqn. (6)}$$
$$= I_{CONT} + I_{DIS-1} + I_{DIS-2}$$

Therefore, one continuous interference filtering procedure (never holding the filter state) may be used for $I_{perceived,\ not\ affected}$ and two duplicate, discontinuous filtering procedures may be used for $I_{perceived,\ affected}$ where one filtering procedure is used during the period (phase 1) when this HBR UE is transmitting on the E-DCH and another filtering procedure is used during the period (phase 2) when this HBR UE is not transmitting on the E-DCH.

Referring to FIG. 6B, a HBR UE may be transmitting on the DCH (e.g., E-DCH) on the uplink during TTIs #2, #4, #5 and #7 (shown as shaded). Using the interference estimation technique of exemplary embodiments described herein, a continuous interference estimation 610 may be implemented at base station 130 during all of the TTIs, where the continuous interference estimation 610 may be used to estimate $I_{perceived,\ not\ affected} = I_{CONT}$. Discontinuous interference estimation may be implemented at base station 130 during the periods, phase 1 630, when this HBR UE is transmitting on the DCH (e.g., E-DCH) and during the periods, phase 2 620, when this HBR UE is not transmitting on the DCH. The discontinuous interference estimation may be used to estimate $I_{perceived,\ affected}$.

Figure 7A:
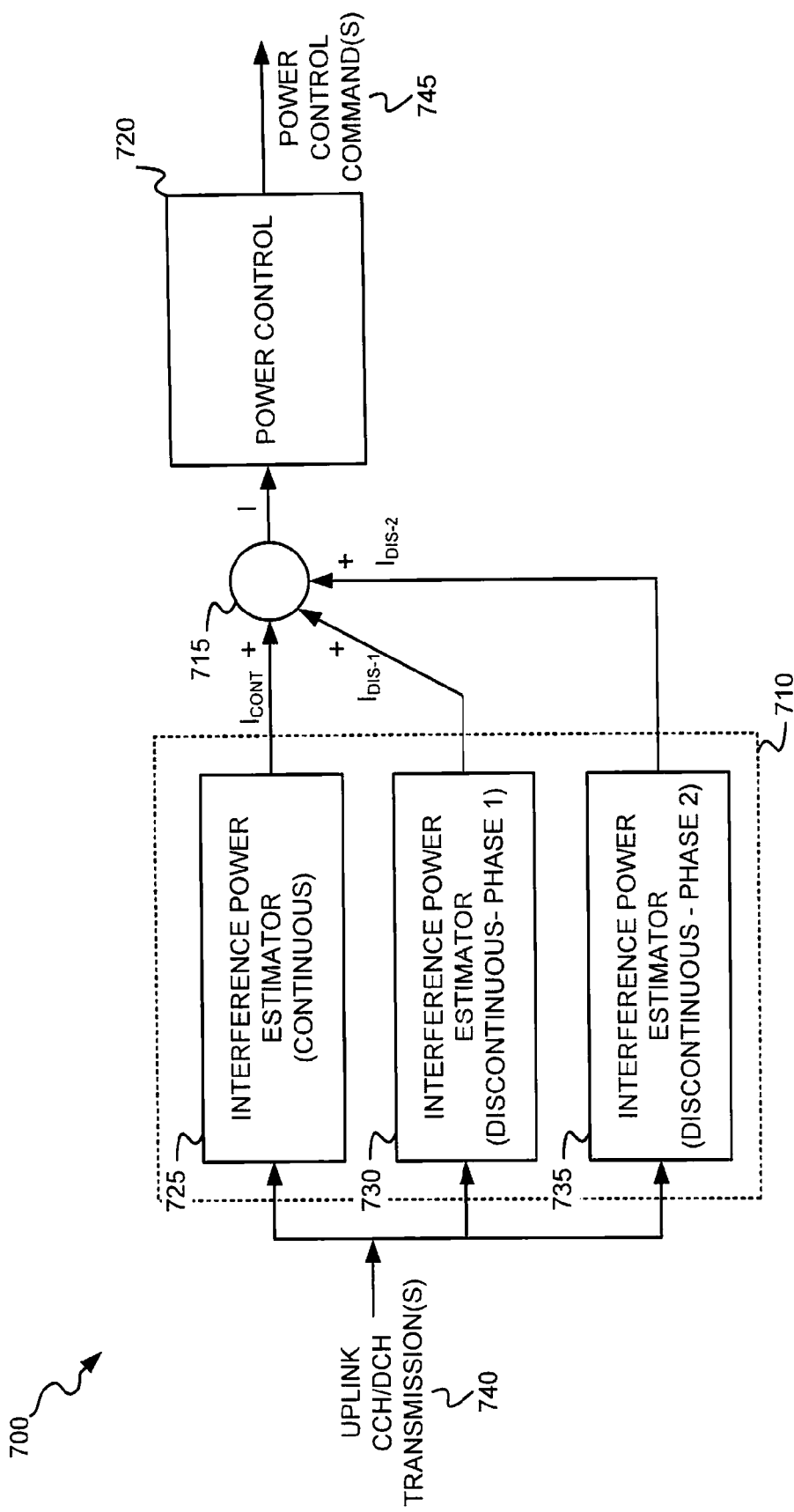
FIG. 7A is a diagram of exemplary components of power control circuitry associated with a transceiver of a base station of the cellular network of FIG. 2.

FIG. 7A is a diagram of exemplary components of power control circuitry 700 associated with transceiver 305 of base station 130. Power control circuitry 700 may estimate signal and interference power associated with uplink transmissions to determine power control commands that may be sent to device 110 for controlling the uplink transmit power. Power control circuitry 700 may include an interference power estimator 710, a summation unit 715, and a power control unit 720. As shown in FIG. 7A, interference power estimator 710 may further include a continuous interference power estimator 725, a discontinuous interference power estimator (phase 1) 730 and a discontinuous interference power estimator (phase 2) 735. Power control circuitry 700 may include additional components not shown in FIG. 7A (e.g., additional signal power and/or interference power estimation components) and/or different components than those shown in FIG. 7A.

Continuous interference power estimator 725 may estimate the interference associated with uplink transmission of signals from device 110 to base station 130. As described above with respect to FIG. 6B, continuous interference power estimator 725 may estimate the interference $I_{CONT}$ during all TDM TTIs on the uplink. Discontinuous interference power estimator (phase 1) 730 may estimate the interference $I_{DIS-2}$ during the period (phase 1) when device 110 is transmitting on the DCH (e.g., E-DCH). Discontinuous interference power estimator (phase 2) 735 may estimate the interference $I_{DIS-2}$ during the period (phase 2) when device 110 is not transmitting on the DCH (e.g., E-DCH). Summation unit 715 may sum the interference estimates $I_{CONT}$, $I_{DIS-1}$ and $I_{DIS-2}$ from estimators 725, 730 and 735 to produce an interference estimate (I) as a result that can be supplied to power control unit 720. In other implementations, summation unit 715 may sum additional values and/or estimates (not shown) with interference estimates $I_{CONT}$, $I_{DIS-1}$ and $I_{DIS-2}$. Power control unit 720 may generate one or more power control commands 745 based on the interference estimate (I). The generated power control command(s) 745 may, when received at device 110, be used in power control loops to raise or lower the transmit power associated with uplink transmissions from device 110. After generation by power control unit 720, the power control command(s) 745 may be transmitted from base station 130 to device 110 on a downlink channel.

Figure 7B:
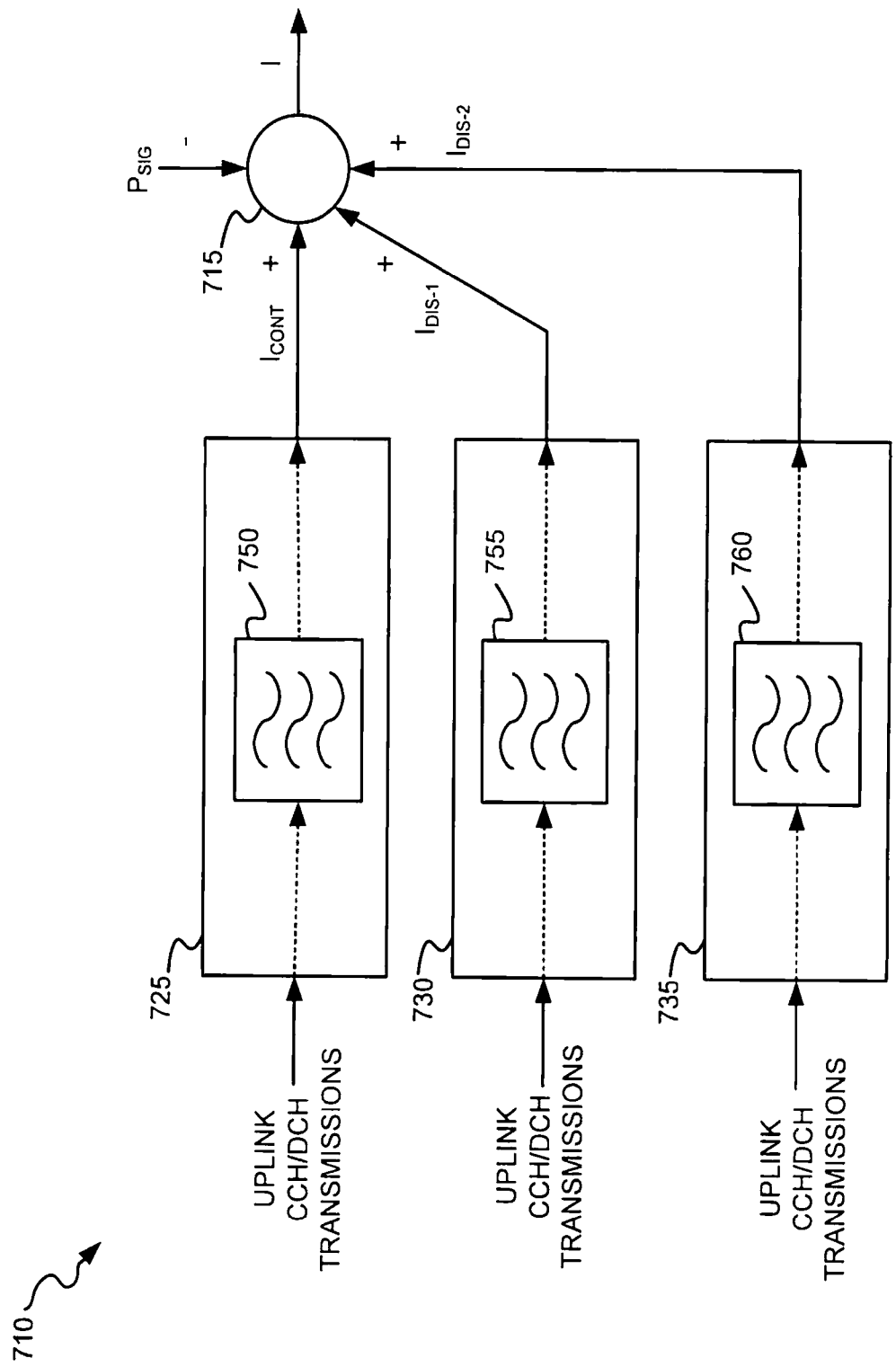
FIG. 7B is a diagram depicting further details of interference estimators of the power control circuitry of FIG. 7A.

FIG. 7B depicts further exemplary details of interference power estimator 710. As shown in FIG. 7B, continuous interference power estimator 725 includes a filtering device 750, discontinuous interference power estimator (phase 1) 730 includes a filtering device 755 and discontinuous interference power estimator (phase 2) 735 includes a filtering device 760. Each of filtering devices 750, 755 and 760 may include digital filters that are used for estimating the interference power associated with uplink transmissions. Other circuitry components (not shown) may additionally be associated with, or may be included in, estimators 725, 730 and/or 735. Furthermore, different circuitry components, than those shown in FIG. 7B, may be associated with, or may be included in, estimators 725, 730 and/or 735.

FIG. 8 is a diagram of exemplary components of power control circuitry 800 associated with transceiver 405 of device 110. Power control circuitry 800 may issue power control signals to transmitter 820, based on power control commands received from base station 130, to adjust the uplink transmit power. Power control circuitry 800 may include a power control unit 810 and a transmitter 820. Power control unit 810 receives power control command(s) 745, generated by and transmitted from base station 130, and issues power control signals to transmitter 820. For example, if the received power control command(s) indicates that the uplink power should be increased, power control unit 810 may issue a power control signal(s) to transmitter 820 commanding transmitter 820 to increase the transmit power on uplink transmissions (e.g., by a specified number of dBs). As another example, if the received power control command(s) indicates that the uplink power should be decreased, power control unit 810 may issue a power control signal(s) to transmitter 820 commanding transmitter 820 to decrease the transmit power (e.g., by a speci tied number of dBs) on the uplink transmission. Transmitter 820 may subsequently transmit uplink CCH (e.g., DPCCH) and/or DCH transmissions (e.g., E-DPCCH or E-DPDCH) using the increased or decreased power levels commanded by power control unit 810.

Figure 9:
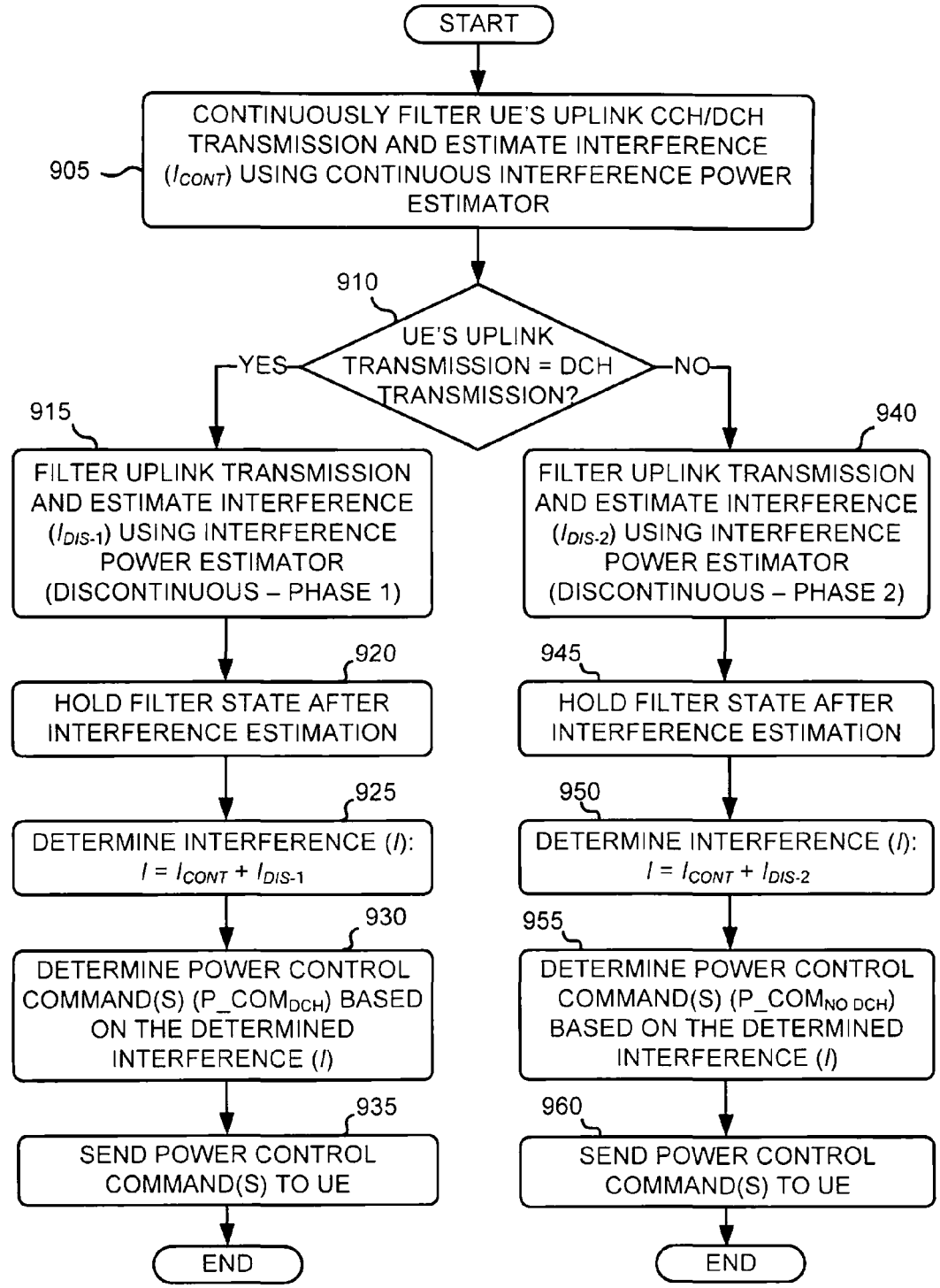
FIG. 9 is a flowchart of an exemplary process for estimating interference power associated with uplink transmissions and sending power control commands to the user equipment device of FIG. 1 or 2.

FIG. 9 is a flowchart of an exemplary process for estimating interference power associated with uplink transmissions received at device 130 from UE device 110. The process exemplified by FIG. 9 may be implemented by base station 130.

The exemplary process may begin with the continuous filtering of the UE's uplink control channel (CCH) and/or data channel (DCH) transmissions and the estimation of interference ($I_{CONT}$) using continuous interference power estimator 725 (block 905). The interference $I_{CONT}$ corresponds to Eqn. (4) above. Continuous interference estimator 725 may continuously filter the uplink transmissions, using filter 750, during both of the periods when UE device 110 is transmitting on the DCH (e.g., E-DCH) and when UE device 110 is not transmitting on the DCH (e.g., may be transmitting on the CCH).

A determination may be made whether the UE's uplink transmission includes a data channel (DCH) transmission (block 910). The uplink transmission may be analyzed to determine whether the uplink transmission from UE device 110 includes a DCH transmission (e.g., E-DPCCH or E-DPDCH). If so (block 910—YES), then the uplink transmission may be filtered and the interference ($I_{DIS-1}$) may be estimated using discontinuous interference power estimator 730 (phase 1) (block 915). Filter 755 of discontinuous interference power estimator 730 may be used to filter the uplink transmission during the period when UE device 110 is transmitting on the DCH (e.g., E-DPCCH or E-DPDCH). The filter state of filter 755 of discontinuous interference power estimator 730 (phase 1) may be held (block 920) until the next use of discontinuous interference power estimator 730. Thus, the state of filter 755 of estimator 730 at the time UE device 110 stops transmitting on the DCH may be stored and held until the next uplink transmission from UE device 110.

An interference value (I) may be determined (block 925) using:

$$I = I_{CONT} + I_{DIS-1} \qquad \text{Eqn. (7)}$$

Interference value I may be determined by summation unit 715. Power control commands (P_COM$_{DCH}$) may be determined based on the determined interference (I) (block 930). Power control unit 720 may determine a power increase or decrease, based on the determined interference (I), that will adjust the uplink transmit power of UE device 110 such that a SIR target can be achieved at BS 130. The power control commands may be determined based on the determined power increase or decrease. The determined power control commands (P_COM$_{DCH}$) may be sent to the UE (block 935). Base station 130 may transmit the power control commands to UE device 110 (e.g., over the air interface).

If the UE's uplink transmission does not include a DCH transmission (block 910—NO), then the uplink transmission may be filtered and the interference ($I_{DIS-2}$) may be estimated using discontinuous interference power estimator 735 (phase 2) (block 940). Filter 760 of discontinuous interference power estimator 735 may be used to filter the uplink transmission during the period when UE device 110 is not transmitting on the DCH (e.g., E-DCCH or E-DPDCH). The filter state of discontinuous interference power estimator 735 (phase 2) may be held (block 945) until the next use of discontinuous interference power estimator 735. Thus, the state of filter 760 of estimator 735 at the time UE device 110 starts transmission on the DCH may be stored and held until the next uplink DCH transmission from UE device 110 completes.

An interference value (I) may be determined (block 950) using:

$$I = I_{CONT} + I_{DIS-2} \qquad \text{Eqn. (8)}$$

Interference value (I) may be determined by summation unit 715. Power control commands (P_COM$_{NO\ DCH}$) may be determined based on the determined interference (I) (block 955). Power control unit 720 may determine the power control commands (P_COM$_{NO\ DCH}$) using the determined interference (I). Power control unit 720 may determine a power increase or decrease, based on the determined interference (I), that will adjust the output transmit power of UE device 110 such that a SIR target can be achieved at base station 130. The power control commands may be determined based on the determined power increase or decrease. The determined power control commands (P_COM$_{NO\ DCH}$) may be sent to the UE (block 960). Power control unit 720 may pass the determined power control commands to transceiver 305 for transmission to UE device 110 (e.g., via the air interface).

The exemplary process of FIG. 9 may be selectively repeated for each transmission time interval (TTI) associated with the UE's uplink transmission.

Figure 10:
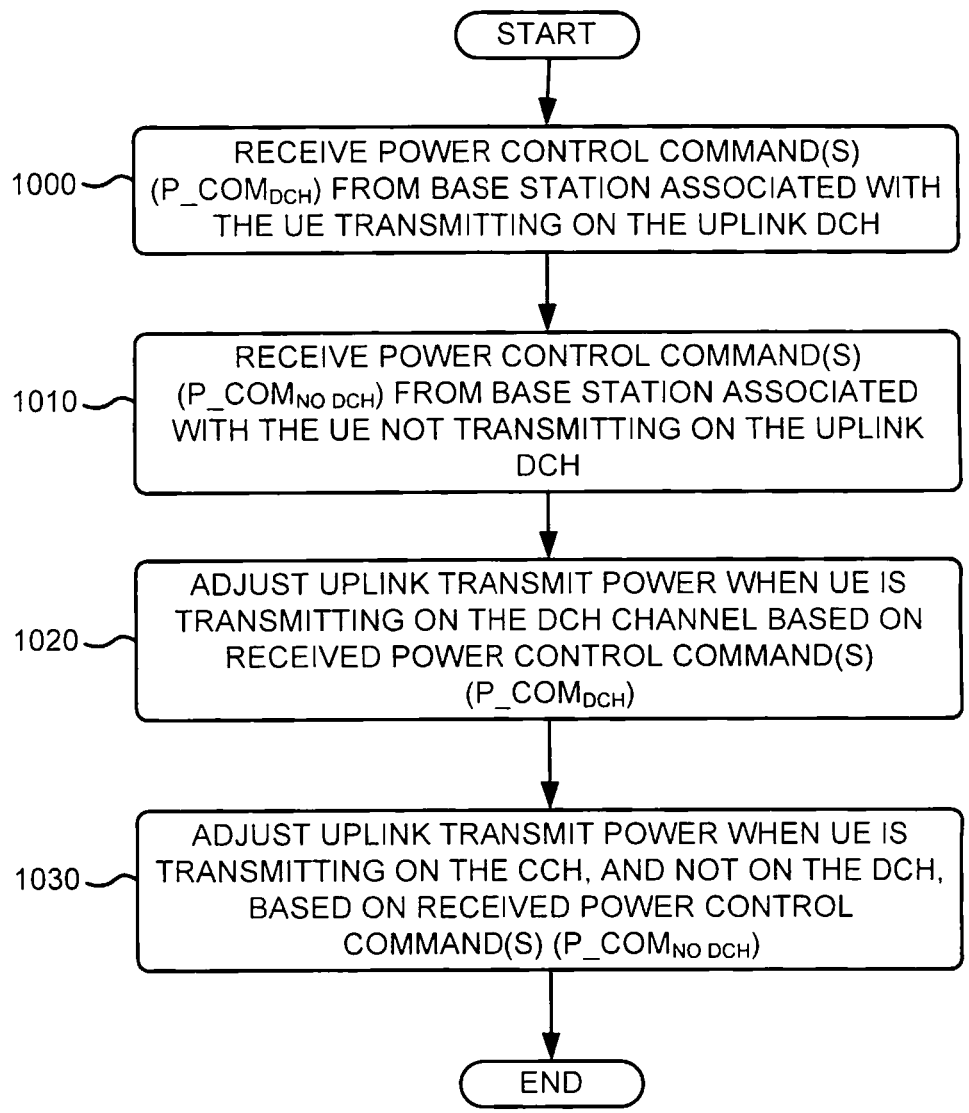
FIG. 10 is a flowchart of an exemplary process for controlling uplink transmission power levels at the user equipment device of FIG. 1 or 2 based on power control commands received from the base station of FIG. 2.

FIG. 10 is a flowchart of an exemplary process for controlling uplink transmission power levels at device 110 based on power control commands received from base station 130. The process exemplified by FIG. 10 may be implemented by device 110.

The exemplary process may begin with the receipt of a power control command(s) (P_COM$_{DCH}$), associated with the UE transmitting on the uplink DCH, from base station 130 (block 1000). The power control command(s) (P_COM$_{DCH}$) may have been determined in block 930 of FIG. 9 at base station 130. A power control command(s) (P_COM$_{NO\ DCH}$), associated with the UE not transmitting on the uplink DCH, may be received from base station 130 (block 1010). The power control command(s) (P_COM$_{NO\ DCH}$) may have been determined in block 955 of FIG. 9 at base station 130.

Uplink transmit power may be adjusted when the UE is transmitting on the DCH channel based on the received power control command(s) (P_COM$_{DCH}$) (block 1020). Power control unit 810 may send control signals to transmitter 820 to adjust the uplink transmit power based on P_COM$_{DCH}$. Uplink transmit power may be adjusted when UE is transmitting on the CCH, and not on the DCH, based on the received power control command(s) (P_COM$_{NO\ DCH}$) (block 1030). Power control unit 810 may send control signals to transmitter 820 to adjust the uplink transmit power based on P_COM$_{NO\ DCH}$.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 9 and 10, the order of the blocks may be modified in other implementations consistent with the principles of the invention. Further, non-dependent blocks may be performed in parallel Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system implemented in a station associated with a wireless network, where the station receives uplink time division multiplexed (TDM) transmissions from a user device, the system comprising:
   a first filter configured to filter uplink TDM transmissions, associated with the user device, during a first period of time when the user device is transmitting on an uplink data channel (DCH) to generate a first interference estimate including an estimate of signal power associated with the user device transmitting on the uplink DCH;
   a second filter configured to filter uplink TDM transmissions, associated with the user device, during a second period of time when the user device is not transmitting on the uplink DCH to generate a second interference estimate including an estimate of interference associated with another user device transmitting on the uplink DCH;
   a third filter configured to filter uplink TDM transmissions, associated with the user device, during the first and second periods of time, to generate a third interference estimate including an estimate of interference associated with other user devices transmitting on an uplink control channel (CCH) and an estimate of signal power associated with the user device transmitting on the uplink CCH; and
   a power control unit configured to determine one or more power control commands for sending to the user device based on the first, second and third interference estimates.

2. The system of claim 1, where the uplink DCH comprises an Enhanced Dedicated Physical Data Channel (E-DPDCH) of a High Speed Uplink Packet Access (HSUPA) system.

3. The system of claim 1, where the uplink DCH comprises an Enhanced Dedicated Physical Control Channel (E-DPCCH) of a High Speed Uplink Packet Access (HSUPA) system.

4. The system of claim 1, where the first, second and/or third filter comprises a digital filter.

5. The system of claim 1, where the first filter is configured to hold its state during the second period of time.

6. The system of claim 1, where the second filter is configured to hold its state during the first period of time.

7. The system of claim 1, further comprising:
   a summation unit to sum the first, second and third interference estimates to produce an interference value,
   where the power control unit is further configured to determine the one or more power control commands based on the interference value.

8. The system of claim 1, where the first time period comprises a first transmission time interval (TTI) associated with the uplink DCH.

9. The system of claim 8, where the second time period comprises a second TTI associated with the uplink DCH.

10. The system of claim 9, where the first and second time periods represent successive transmission time intervals (TTIs) associated with the uplink DCH.

11. A method implemented at a base station that receives uplink time division multiplexed (TDM) transmissions from a user device, the method comprising:
    using a first filter, filtering uplink TDM transmissions, associated with the user device, during a first period of time when the user device is transmitting on an uplink data channel (DCH), but not during a second period of time when the user device is not transmitting on the uplink DCH, to generate a first interference including an estimate of signal power associated with the user device transmitting on the uplink DCH;
    using a second filter, filtering uplink TDM transmissions, associated with the user device, during the second period of time, but not during the first period of time, to generate a second interference estimate including an estimate of interference associated with another user device transmitting on the uplink DCH;
    using a third filter, filtering uplink TDM transmissions, associated with the user device, during the first and second periods of time, to generate a third interference estimate including an estimate of interference associated with other user devices transmitting on an uplink control channel (CCH) and an estimate of signal power associated with the user device transmitting on the uplink CCH; and
    determining one or more power control commands for sending to the user device based on the first, second and third interference estimates.

12. The method of claim 11, where the uplink DCH comprises an Enhanced Dedicated Physical Data Channel (E-DPDCH) and/or an Enhanced Dedicated Physical Control Channel (E-DPCCH) of a High Speed Uplink Packet Access (HSUPA) system.

13. The method of claim 11, where a first filter filters the uplink TDM transmissions during the first period of time and further comprising:
    holding a state of the first filter during the second period of time.

14. The method of claim 13, where a second filter filters the uplink TDM transmissions during the second period of time and further comprising:
    holding a state of the second filter during the first period of time.

15. The method of claim 11, further comprising:
    summing the first, second and third interference estimates to produce an interference value,
    where determining the one or more power control commands is further based on the interference value.

16. The method of claim 11, where the first and second time periods comprise different transmission time intervals (TTIs) associated with the uplink DCH.

17. The method of claim 16, where the first and second time periods represent successive transmission time intervals (TTIs) associated with the uplink DCH.

18. A base station comprising a wireless network which receives uplink time division multiplexed (TDM) transmissions from a user device, the base station comprising:
    a processor configured to determine if an uplink transmission from a user equipment is on an uplink data channel (DCH) or an uplink control channel (CCH);
    a first filter configured to filter uplink TDM transmissions, associated with the user device, during a first period of time when the user device is transmitting on the uplink DCH to generate a first interference estimate;
    a second filter configured to filter uplink TDM transmissions, associated with the user device, during a second period of time when the user device is not transmitting on the uplink DCH to generate a second interference estimate;

a third filter configured to filter uplink TDM transmissions, associated with the user device, during the first and second periods of time including when the user device is transmitting on the uplink CCH to generate a third interference estimate; and a power control unit configured to determine one or more power control commands for sending to the user device based on the first, second, and third interference estimates.

* * * * *

UNITED STATES PATENT AND TRADEMARK OFFICE
CERTIFICATE OF CORRECTION

PATENT NO. : 8,599,742 B2  
APPLICATION NO. : 12/867359  
DATED : December 3, 2013  
INVENTOR(S) : Liu et al.

Page 1 of 1

It is certified that error appears in the above-identified patent and that said Letters Patent is hereby corrected as shown below:

In the Specification

In Column 1, Line 22, delete "Standards to Institute," and insert -- Standards Institute, --, therefor.

In Column 4, Line 45, delete "210d-2100." and insert -- 210d-210f). --, therefor.

In Column 10, Line 41, delete "speci tied number" and insert -- specified number --, therefor.

Signed and Sealed this  
Twenty-ninth Day of July, 2014

Michelle K. Lee  
*Deputy Director of the United States Patent and Trademark Office*